United States Patent [19]
Habgood

[11] 3,964,581
[45] June 22, 1976

[54] DISC BRAKE ASSEMBLY HAVING A RELEASABLE DRAG-TAKING MEMBER

[75] Inventor: Gordon Alfred Habgood, Shipston-on-Stour, England

[73] Assignee: Girling Limited, Birmingham, England

[22] Filed: Apr. 24, 1974

[21] Appl. No.: 463,613

[30] Foreign Application Priority Data
Apr. 24, 1973 United Kingdom............... 19459/73

[52] U.S. Cl. .............................................. 188/73.3
[51] Int. Cl.[2] ....................................... F16D 65/20
[58] Field of Search................... 188/71.1, 72.4, 73.3

[56] References Cited
UNITED STATES PATENTS

| | | | |
|---|---|---|---|
| 3,220,512 | 11/1965 | Coatalen............................ | 188/72.4 |
| 3,387,687 | 6/1968 | Eggstein et al. ................... | 188/72.4 |
| 3,705,641 | 12/1972 | Brooks et al....................... | 188/73.3 |
| 3,838,753 | 10/1974 | Kestermeier et al............... | 188/73.3 |

FOREIGN PATENTS OR APPLICATIONS

| | | | |
|---|---|---|---|
| 1,227,386 | 11/1961 | France.............................. | 188/73.3 |

*Primary Examiner*—Trygve M. Blix
*Assistant Examiner*—Edward R. Kazenske
*Attorney, Agent, or Firm*—Scrivener Parker Scrivener and Clarke

[57] ABSTRACT

A drag-taking member for a disc brake of the sliding caliper reaction type comprises a pair of circumferentially spaced arms which form drag-taking guide means for a directly actuated friction pad assembly. The radially innermost ends of the arms are separate from each other, and the arms are interconnected by an integral bar disposed at one axial end of the member.

3 Claims, 6 Drawing Figures

DISC BRAKE ASSEMBLY HAVING A RELEASABLE DRAG-TAKING MEMBER

SPECIFIC DESCRIPTION

This invention relates to a new or improved drag-taking member for use in a disc brake for vehicles of the kind in which friction pad assemblies for engagement with opposite faces of a rotatable disc are located in a caliper which straddles the periphery of the disc and is guided for axial sliding movement with respect to the drag-taking member which is adapted to be secured to a fixed part adjacent to the disc, one friction pad assembly, known as the directly actuated friction pad assembly, being applied directly to one face of the disc by actuating means housed in an adjacent limb of the caliper and the other friction pad assembly, known as the indirectly actuated friction pad assembly, being applied to the opposite face of the disc by the reaction of the applying means which causes the caliper to slide axially with respect to the stationary member.

Known constructions of drag-taking members for disc brakes of the kind set forth comprise circumferentially spaced arms between which a caliper is adapted to be guided and which are adapted to form drag-taking guide means for the directly actuated friction pad assembly. The arms are interconnected at their radially innermost ends by a circumferentially extending bar which restricts or limits in a radially inwards direction the size of caliper and directly actuated friction pad assembly which can be accommodated within a given space and the proximity of the caliper and pad assembly to a wheel hub.

According to our invention a stationary drag-taking member for use in a disc brake of the kind set forth for vehicles comprises a pair of circumferentially spaced arms which form drag-taking guide means for a directly actuated friction pad assembly, the radially innermost ends of the arms being separate from each other, and the arms being interconnected by an integral bar disposed at one axial end of the member.

By ensuring that the arms are separate from each other at their radially innermost ends increases the effective space in a radially inwards direction for the installation of a directly actuated friction pad assembly and a caliper. Thus, a larger caliper and friction pad assembly can be provided and can extend close to the hub of a wheel.

Preferably, the arms, which normally terminate before the disc when the member is installed in a disc brake, are provided with axial connecting portions which extend over the peripheral edge of the disc and the axial connecting portions are continuous with radial connecting portions which extend inwardly in a radial direction to a position inwardly of the limb of the caliper which acts on the indirectly actuated friction pad assembly, the free end of the radial connecting portions being interconnected by the bar which extends circumferentially.

Alternatively the integral circumferentially extending bar interconnects the arms at a position radially outwardly from the caliper adjacent to the limb which incorporates the actuating means.

Conveniently the drag taking member is constructed from a one-piece casting or forging and the circumferentially extending bar which interconnects the arms is constructed and arranged such that the guiding surfaces in the arms for the caliper and the directly actuated friction pad assembly can be machined in a single operation, conveniently by broaching, without interfering with the bar.

When installed in a disc brake, the drag-taking member is connected to a stationary part adjacent to one face of the disc by means of circumferentially spaced bolts screwed into tapped holes in the free radially innermost ends of the arms.

Preferably bolts are perpendicular to the line of action of the drag force taken by the arms in the application of the brake. Thus, the bolts are preferably parallel to a radius of the brake passing through the centres of pressure of the friction pad assemblies.

Two embodiments of our invention are illustrated in the accompanying drawings in which.

Figure 1:
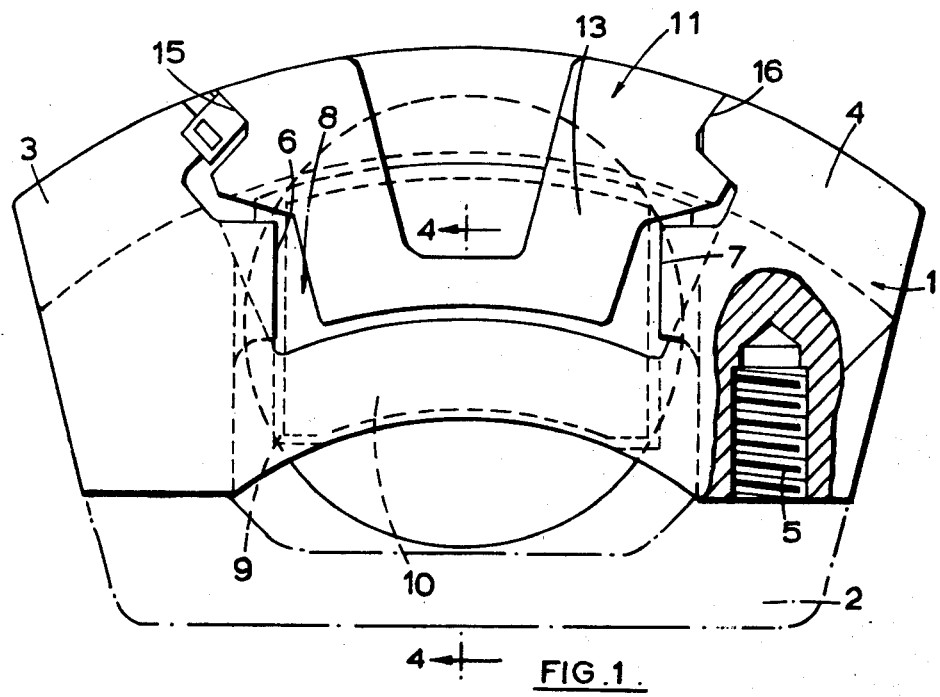
FIG. 1 is an end elevation of a disc brake for a vehicle.
Figure 2:
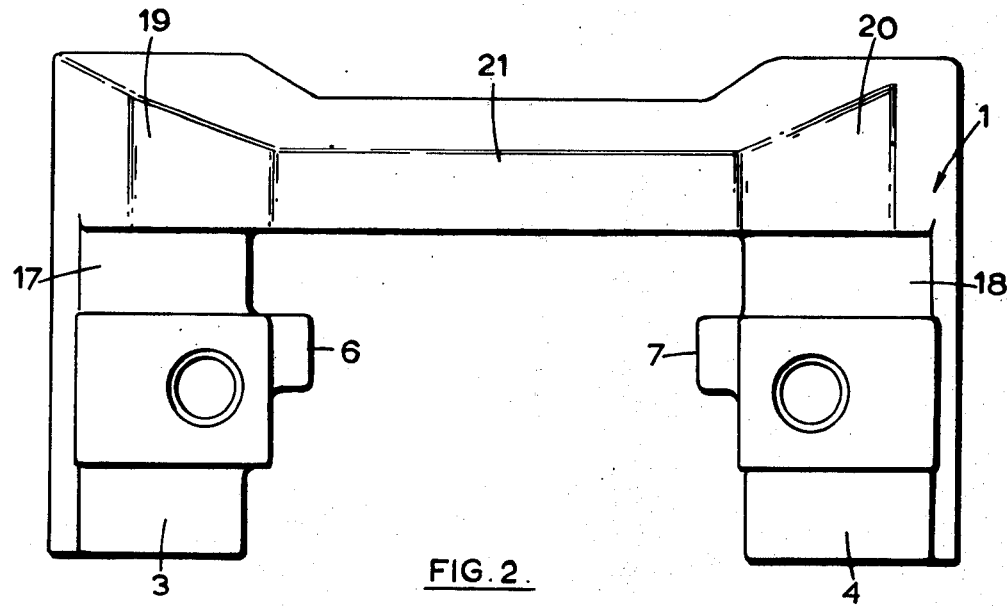
FIG. 2 is an inverted plan-view of the stationary drag-taking member incorporated in the disc brake of FIG. 1.
Figure 3:
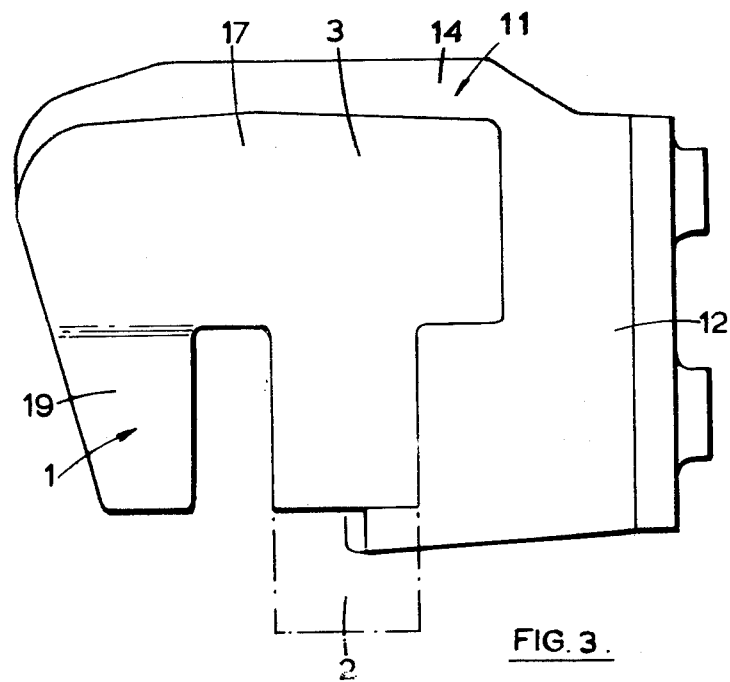
FIG. 3 is a side elevation of the brake illustrated in FIG. 1.
Figure 4:
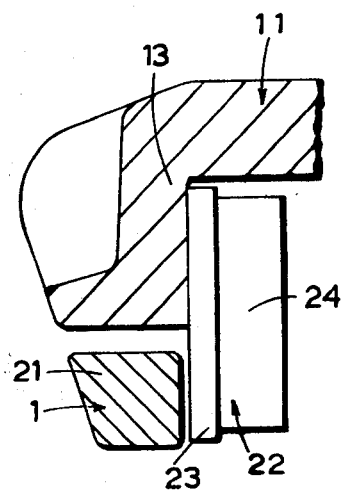
FIG. 4 is a section on the line 4—4 of FIG. 1.

The disc brake illustrated in FIGS. 1 to 4 of the accompanying drawings comprises a stationary drag-taking member 1 which is mounted on a fixed part 2 adjacent to the inboard side of a rotatable disc (not shown). The stationary member comprises a pair of circumferentially spaced arms 3,4 which extend radially outwards beyond the peripheral edge of the disc. The arms are separate from each other at their radially innermost ends and the arms are provided with tapped holes 5 into which are screwed bolts for securing the member 1 to the stationary part 2. The tapped holes 5 are parallel with each other and are parallel with a radius of the disc passing through the circumferential mid-point of the member 1.

Portions of the inner surfaces of the arms 3 and 4 which lie within the periphery of the disc comprise parallel surfaces 6 and 7 between which are slidably guided in end edges of a directly actuated friction pad assembly 8. The directly actuated friction pad assembly 8 comprises a rigid backing plate 9 slidably engaging with the guiding surfaces 6,7 and carrying a pad 10 of friction material for engagement with an adjacent face of the disc.

A caliper 11 of generally U-shaped outline comprising axially spaced limbs 12 and 13 connected by an integral bridge piece 14 straddles the disc and is received in a gap defined between the portions of the spaced arms 3,4 which lie outside the peripheral edge of the disc. Circumferentially outermost ends of the bridge piece 14 are formed with axially extending outwardly directed grooves 15,16 which receive portions of the arms 3 and 4.

The portions of the arms 3,4 which lie outside the periphery of the disc are integral with axially extending connecting portions 17,18 which extend over the peripheral edge of the disc and, at their outermost ends, are integral with inwardly directed circumferentially spaced radial connecting portions 19,20 of which the inner ends are interconnected at a position inwardly of the caliper 11 by an integral circumferentially extending bar 21.

The limb 12 of the caliper incorporates hydraulic actuating means for applying the indirectly actuated friction pad assembly 8 to the disc. This limb may also incorporate mechanical actuating means. The opposite limb 13 of the caliper 11 carries an indirectly actuated friction pad assembly 22 comprising a rigid backing plate 23 carrying a pad 24 of friction material. The bar 21 is spaced inwardly from the inner end of the limb 13 of the caliper 11 and it is also spaced from the backing plate 23.

Figure 5:
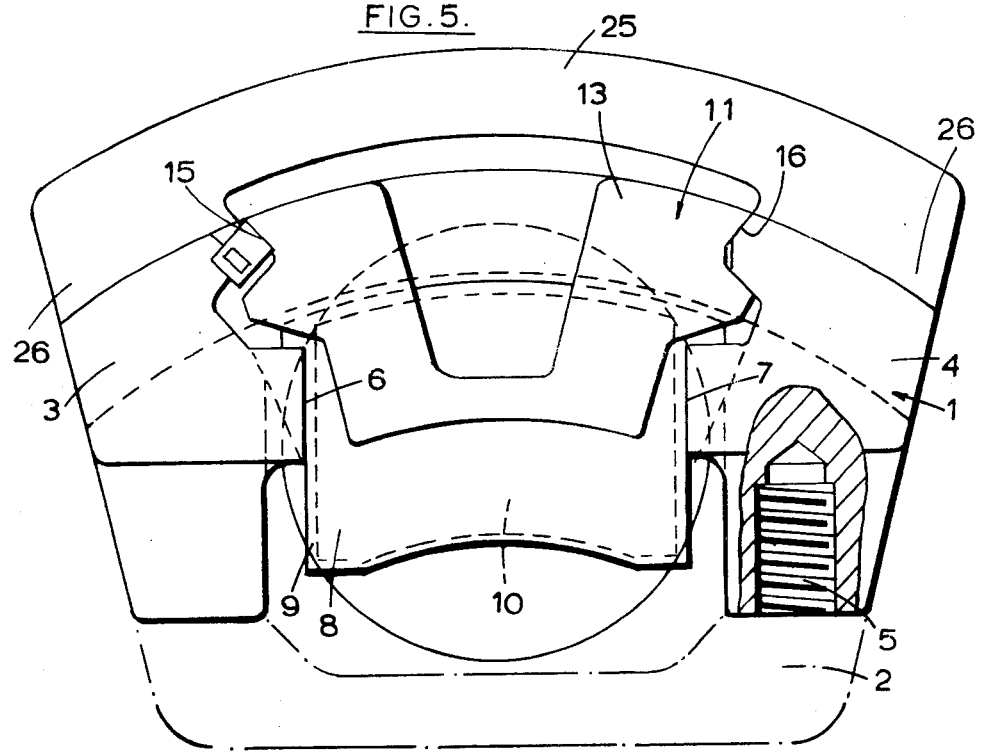
FIG. 5 is an end elevation of a further disc brake for a vehicle.
Figure 6:
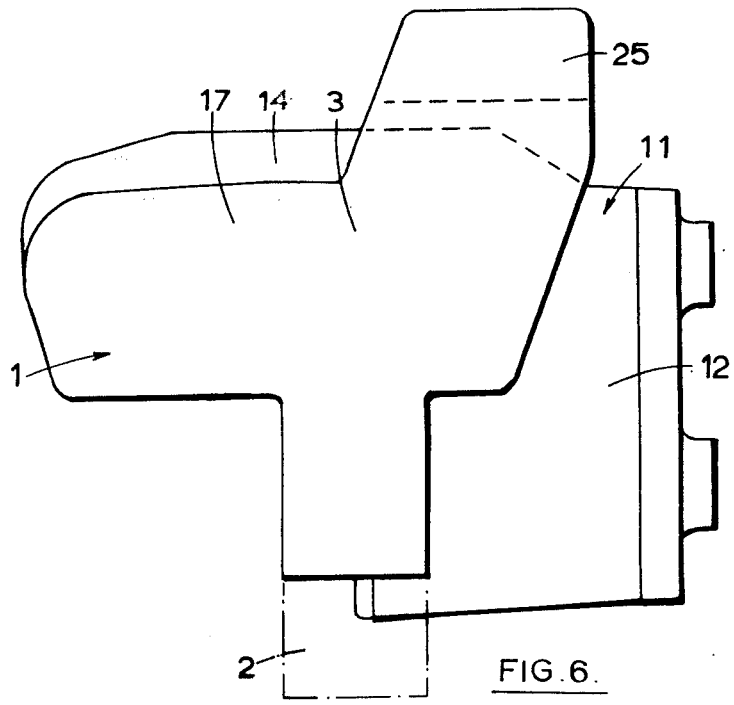
FIG. 6 is a side elevation of the brake illustrated in FIG. 5.

In a modified construction of the brake illustrated in FIGS. 5 and 6 of the drawings the arms 3 and 4 are interconnected adjacent to the limb 12 of the caliper 11 by means of a circumferentially extending bar 25 which bridges the caliper 11 and is integral with the free ends of a pair of radial extensions 26 integral with the arms 3 and 4.

The construction of the brake illustrated in FIGS. 5 and 6 is otherwise the same as that of FIGS. 1 to 4 and corresponding reference numerals have been applied to corresponding parts.

The stationary drag-taking member in accordance with our invention is constructed and arranged to increase the dimension in a radially inwards direction of the radial space available to accommodate a disc brake in the otherwise limited space defined between the wheel and its hub. When the arms are interconnected at their radially outermost ends by a bar, the bar is located in such a position that it will be located inboard of the hub space when installed in a vehicle.

I claim:

1. A disc brake for a vehicle comprising a rotatable disc, a caliper straddling a portion of the peripheral edge of said disc, and having opposed limbs, friction pad assemblies for engagement with opposite faces of said disc located in said caliper, a drag-taking member adapted to be secured to a fixed part adjacent to said disc and on which said caliper is guided for axial sliding movement relative to said disc, and actuating means in one limb of said caliper for applying one of said friction pad assemblies directly to said disc, the other of said friction pad assemblies being applied to said disc by the other limb of said caliper by the reaction of said actuating means which causes said caliper to move axially with respect to said drag-taking member, said drag-taking member having opposed axial ends and comprising a pair of separate spaced arms forming first drag-taking means for said directly actuated friction pad assembly and second separate guide means for said caliper, said arms having separate, free, circumferentially spaced radially innermost ends, each of the innermost ends of said arms having an opening whose axis is substantially parallel with a radius of the disc passing through the circumferential midpoint of said drag-taking member, fastening means cooperating with each of said openings for releasably connecting said drag-taking member to said fixed part in a direction substantially perpendicular to a line of action of the drag forces taken by the respective arms in the application of the brake, and a bar disposed at one of said axial ends of said member and separate from said opening and fastening means integrally interconnecting said spaced arms to maintain them in a circumferentially spaced relationship, said bar forming the sole integral connections between the arms.

2. A disc brake as claimed in claim 1, wherein said bar is located at the axial end of the drag-taking member remote from the limb of said caliper in which said actuating means is housed.

3. A disc brake as claimed in claim 1, wherein said bar is located at the axial end of said drag-taking member adjacent to the limb of the caliper in which said actuating means is housed but radially outwardly thereof.

* * * * *